US011166411B2

(12) United States Patent
Fuse et al.

(10) Patent No.: US 11,166,411 B2
(45) Date of Patent: Nov. 9, 2021

(54) LAWN MOWER

(71) Applicant: Yamabiko Corporation, Tokyo (JP)

(72) Inventors: Yoichi Fuse, Tokyo (JP); Ryota Yamada, Tokyo (JP)

(73) Assignee: Yamabiko Corporation, Tokyo (JP)

( * ) Notice: Subject to any disclaimer, the term of this patent is extended or adjusted under 35 U.S.C. 154(b) by 257 days.

(21) Appl. No.: 16/293,078

(22) Filed: Mar. 5, 2019

(65) Prior Publication Data

US 2019/0274245 A1 Sep. 12, 2019

(30) Foreign Application Priority Data

Mar. 6, 2018 (JP) .............................. JP2018-039350

(51) Int. Cl.
*A01D 34/73* (2006.01)
*A01D 34/00* (2006.01)
(Continued)

(52) U.S. Cl.
CPC ......... *A01D 34/733* (2013.01); *A01D 34/008* (2013.01); *A01D 34/736* (2013.01);
(Continued)

(58) Field of Classification Search
CPC .. A01D 34/733; A01D 34/008; A01D 34/736; A01D 34/661; A01D 34/74; A01D 2101/00; A01D 34/63; A01D 34/66
See application file for complete search history.

(56) References Cited

U.S. PATENT DOCUMENTS 2,654,986 A * 10/1953 Gold .................... A01D 34/736
56/295
2,815,631 A * 12/1957 Northcote .......... A01D 34/8355
56/320.2
(Continued)

FOREIGN PATENT DOCUMENTS

DE 1632819 A1 1/1971
GB 950438 A * 2/1964 ............. A01D 34/63
(Continued)

OTHER PUBLICATIONS

Extended European Search Report for European Patent Application No. 19275022.2, dated Sep. 4, 2019, 7 pages.
(Continued)

*Primary Examiner* — Abigail A Risic
(74) *Attorney, Agent, or Firm* — Withrow & Terranova, PLLC

(57) ABSTRACT

A lawn mower in which an operating part that performs lawn mowing is equipped in a traveling machine body that travels in a field. The operating part comprises a rotary-driven bladed disk in a state of facing the field, and a cutting blade piece rockably mounted on an outer peripheral part of the bladed disk. A mounting part in which the cutting blade piece is mounted on the bladed disk comprises an axial member mounted to cross a field opposed surface of the bladed disk, and a cylindrical member which is hollow and into which the axial member is inserted with a space therebetween. The axial member is mounted on the bladed disk in a state in which the cutting blade piece is fixed to an outer periphery of the cylindrical member and the axial member is inserted into the cylindrical member.

3 Claims, 6 Drawing Sheets

(51) Int. Cl.
 *A01D 34/66* (2006.01)
 *A01D 34/74* (2006.01)
 *A01D 101/00* (2006.01)

(52) U.S. Cl.
 CPC ............ *A01D 34/661* (2013.01); *A01D 34/74* (2013.01); *A01D 2101/00* (2013.01)

(56) References Cited

U.S. PATENT DOCUMENTS

| | | | | |
|---|---|---|---|---|
| 3,000,165 | A * | 9/1961 | Lill | A01D 34/63 56/13.4 |
| 3,010,269 | A * | 11/1961 | Maguire | A01D 34/736 56/295 |
| 3,581,482 | A * | 6/1971 | Reber | A01D 34/63 56/295 |
| D248,474 | S * | 7/1978 | Oosterling | D15/29 |
| 4,473,947 | A * | 10/1984 | Ishida | B26B 13/28 30/261 |
| 5,189,869 | A * | 3/1993 | McBride | A01D 34/003 56/17.5 |
| 5,845,468 | A * | 12/1998 | Richardson | A01D 34/733 56/6 |
| 6,119,350 | A | 9/2000 | Sutliff et al. | |
| 10,575,465 | B2 * | 3/2020 | Ran | A01D 34/84 |
| 2003/0196332 | A1 * | 10/2003 | Harris | A01D 34/733 30/276 |
| 2005/0138913 | A1 * | 6/2005 | Thompson | A01D 34/736 56/295 |
| 2006/0156706 | A1 | 7/2006 | Eavenson, Sr. et al. | |
| 2009/0191024 | A1 * | 7/2009 | Neudorf | F16B 35/041 411/508 |
| 2010/0043378 | A1 * | 2/2010 | Abernethy | A01D 34/733 56/295 |
| 2014/0126952 | A1 | 5/2014 | Fay, II | |
| 2018/0103583 | A1 * | 4/2018 | Stridh | A01D 34/733 |

FOREIGN PATENT DOCUMENTS

| | | |
|---|---|---|
| JP | S5046631 U | 5/1975 |
| JP | S5068815 A | 6/1975 |
| JP | 2002320872 A | 11/2002 |
| JP | 2016185091 A | 10/2016 |
| JP | 2016185099 A | 10/2016 |
| WO | WO-2017063539 A1 * | 4/2017 ........... A01D 34/008 |

OTHER PUBLICATIONS

Search Report for Japanese Patent Application No. 2018-039350, dated Sep. 2, 2021, 14 pages.
Notice of Reasons for Refusal for Japanese Patent Application No. 2018-039350, dated Sep. 14, 2021, 6 pages.

* cited by examiner

LAWN MOWER

RELATED APPLICATION

This application claims priority to Japanese Patent Application No. 2018-039350 filed on Mar. 6, 2018, the disclosure of which is hereby incorporated herein by reference in its entirety.

TECHNICAL FIELD

The present invention relates to a lawn mower and, more particularly, to a lawn mower that can be used as a so-called robotic lawn mower of an unmanned self-propelled type.

BACKGROUND

There has been developed a lawn mower provided with an operating part in which a plurality of thin plate-like cutting blade pieces are axially supported around the outer peripheral part of a rotary-driven bladed disk in a state having allowance and the cutting blade pieces are caused to radially project from the outer peripheral part of the bladed disk by using a centrifugal force generated when the bladed disk is rotated. The operating part of such a lawn mower is often adopted in a so-called robotic lawn mower that performs work according to an unmanned self-propelled method.

In mounting of the cutting blade pieces in the operating part of such a lawn mower, in general, axial bolts are inserted into, in a state having allowance, mounting holes provided in the cutting blade pieces and are screwed and fixed (bolt/nut-fixed) to the outer peripheral part of the bladed disk (See Patent Literature 1 below).

RELATED LITERATURE

Patent Literature

Patent Literature: Japanese Patent Application Laid-open No. 2016-185099

SUMMARY

Technical Problem

In the operating part of such a lawn mower, the cutting blade pieces receive resistance of a lawn during the work and rock around the axial bolts. Therefore, the inner edges of the mounting holes of the cutting blade pieces come into slide contact with the outer peripheral surfaces of the axial bolts and the nuts. In this case, since the cutting blade pieces are thin, contact pressure of slide contact parts increases. The axial bolts and the nuts or the mounting hole inner edges of the cutting blade pieces are worn. Therefore, the axial bolts and the nuts and the cutting blade pieces are consumable components. These consumable components have to be frequently replaced in every set work time.

When the work is continued for a long time, mowed grass and dust intrude into spaces between the axial blots and mounting hole inner edges of the cutting blade pieces. The mowed grass and the like easily twine around the axial bolts. When a lot of mowed grass and the like twine around the axial bolts, the cutting blade pieces are coming to be fixed to the axial bolts. In such a state, if obstacles such as small stones hit the cutting blade pieces during the work, the cutting blade pieces cannot be allowed to escape. Therefore, deformation and damage of the cutting blade pieces easily occur.

The present invention is to cope with such a problem. That is, an object of the present invention is to, for example, increase durability of a mounting part in which a cutting blade piece is mounted on a bladed disk, reduce a replacement frequency of consumable components, prevent the cutting blade piece from being fixed by twined mowed grass and the like and prevent deformation and damage of the cutting blade piece.

Solution to Problem

In order to solve such a problem, a lawn mower according to the present invention includes the following configuration.

A lawn mower in which an operating part that performs lawn mowing is equipped in a traveling machine body that travels in a field, wherein the operating part includes a rotary-driven bladed disk in a state of facing the field, and a cutting blade piece rockably mounted on an outer peripheral part of the bladed disk, a mounting part in which the cutting blade piece is mounted on the bladed disk includes an axial member mounted to cross a field opposed surface of the bladed disk, and a cylindrical member which is hollow and into which the axial member is inserted with a space therebetween, and the axial member is mounted on the bladed disk in a state in which the cutting blade piece is fixed to an outer periphery of the cylindrical member and the axial member is inserted into the cylindrical member.

Advantageous Effects of Invention

With the lawn mower provided with such a configuration, it is possible to increase durability of the mounting part in which the cutting blade piece is mounted on the bladed disk and reduce a replacement frequency of consumable components. Moreover, it is possible to prevent the cutting blade piece from being fixed by twined mowed grass and prevent deformation and damage of the cutting blade piece.

DETAILED DESCRIPTION

Description of Embodiment

Figure 1:
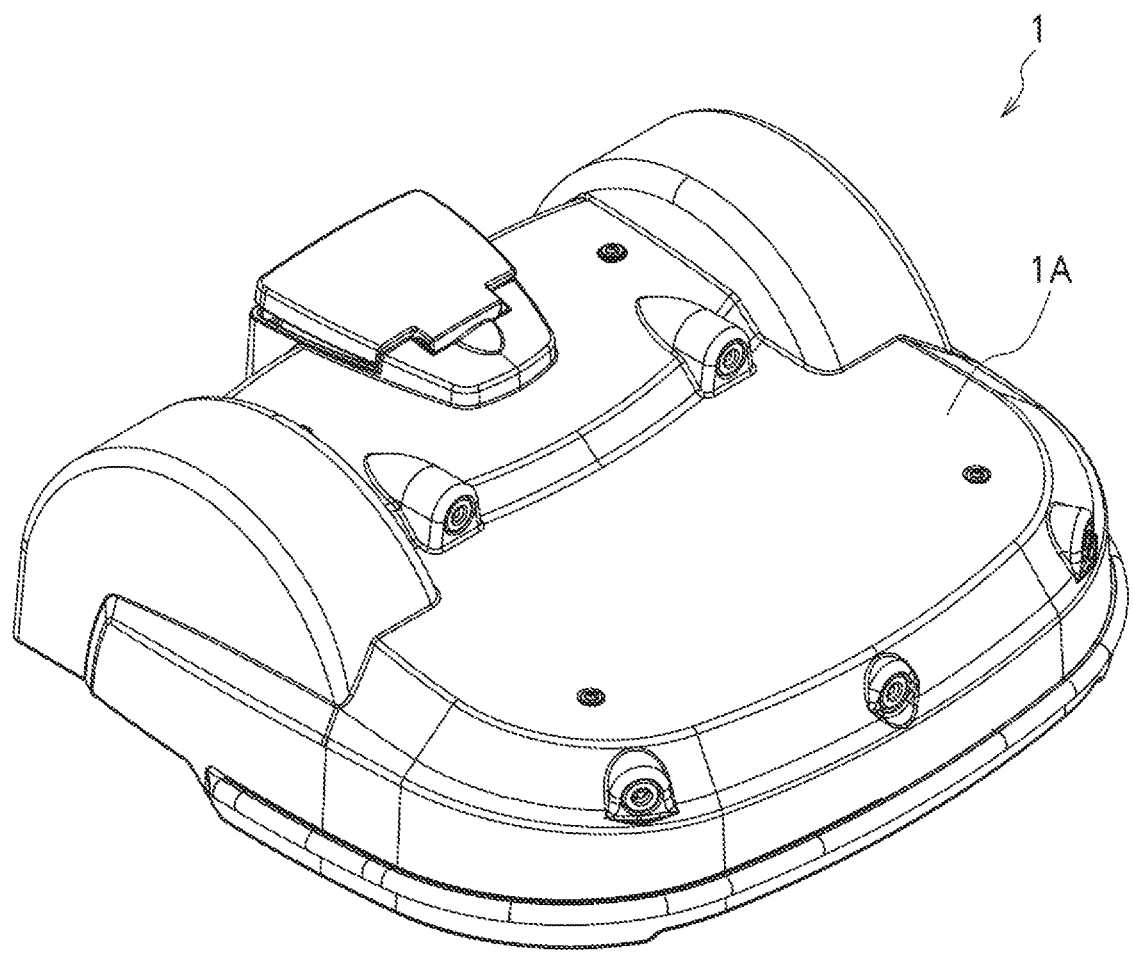
FIG. 1 is an exterior perspective view of a lawn mower.

An embodiment of the present invention is explained below with reference to the drawings. In the following explanation, the same reference numerals and signs in different figures indicate parts having the same functions. Redundant explanation in the figures is omitted as appropriate.

An exterior of a lawn mower is shown in FIG. 1. A lawn mower 1 includes an enclosure 1A, and an operating part and a traveling part explained below inside the enclosure 1A. The lawn mower 1 is an unmanned self-propelled type. The lawn mower 1 uniformly cuts and trims a lawn in a field at a predetermined height while traveling in the field.

Figure 2A:
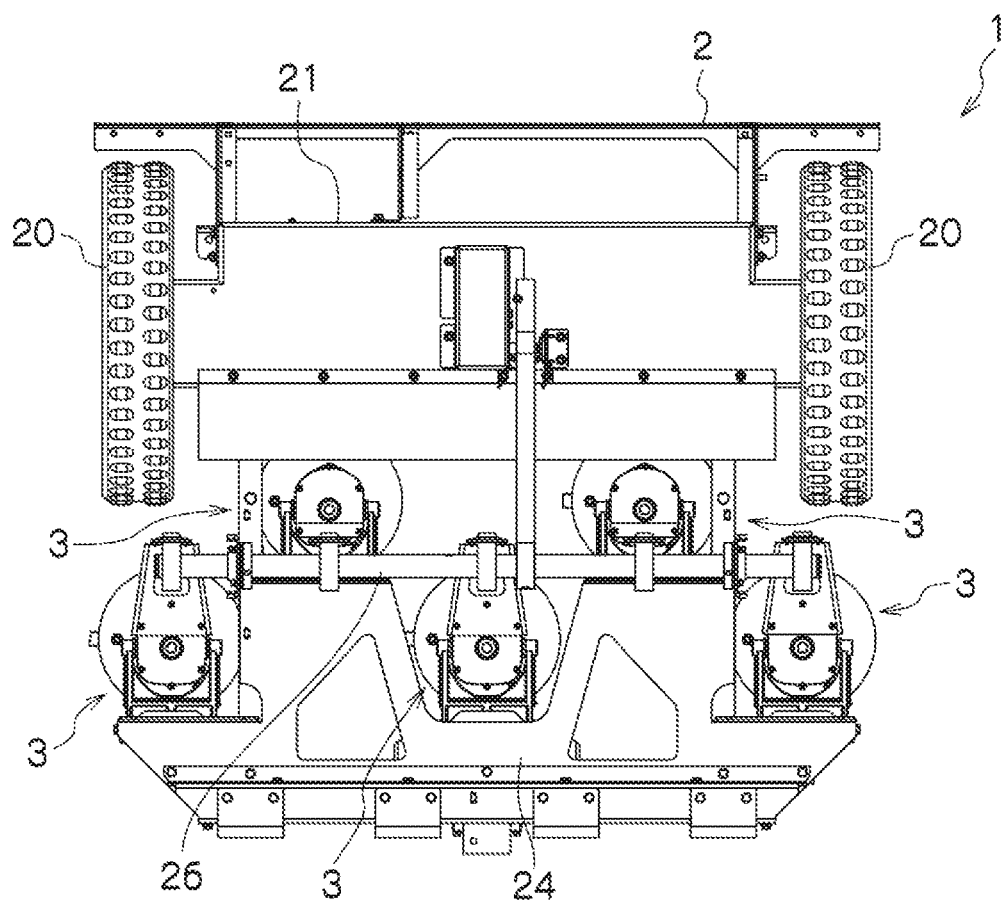
FIG. 2A is an internal structure diagram (a top view) of the lawn mower.
Figure 2B:
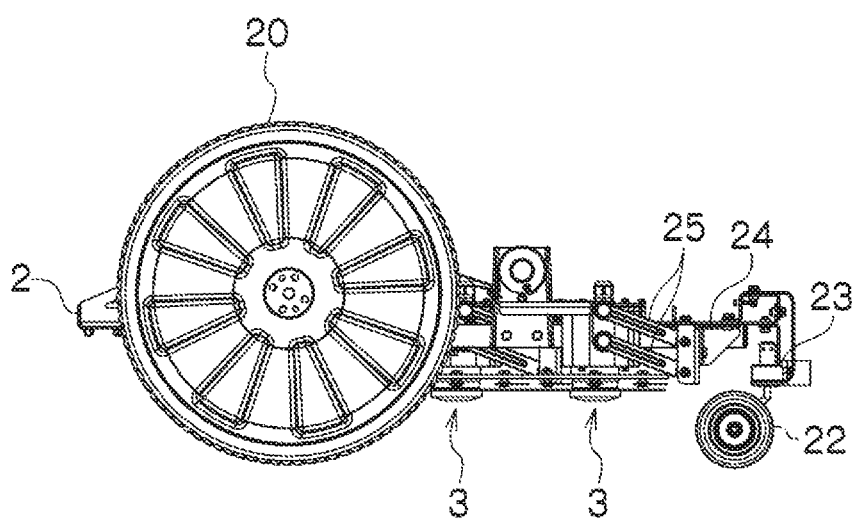
FIG. 2B is an internal structure diagram (a side view) of the lawn mower.

FIGS. 2A and 2B are diagrams in which the enclosure 1A in FIG. 1 is detached, and show the internal structure of the lawn mower 1. The lawn mower 1 includes a traveling machine body 2 and operating parts 3 equipped in the traveling machine body 2. The traveling machine body 2 includes drive wheels 20, a driving part 21 that drives the drive wheels 20, steering wheels 22, a steering adjusting part 23 that controls the steering wheels 22, and the like.

The operating parts 3 are mounted such that vertical heights thereof with respect to a frame 24 of the traveling machine body 2 are adjustable. In an example shown in FIGS. 2A and 2B, five operating parts 3 are equipped in the traveling machine body 2. However, the number of the operating parts 3 can be set as appropriate. In this example, the respective operating parts 3 are equipped to be capable of going up and down with respect to the frame 24 via parallel links 25. The operating parts 3 are coupled by a coupling frame 26 such that the vertical heights of the operating parts 3 are integrally adjustable.

Figure 3:
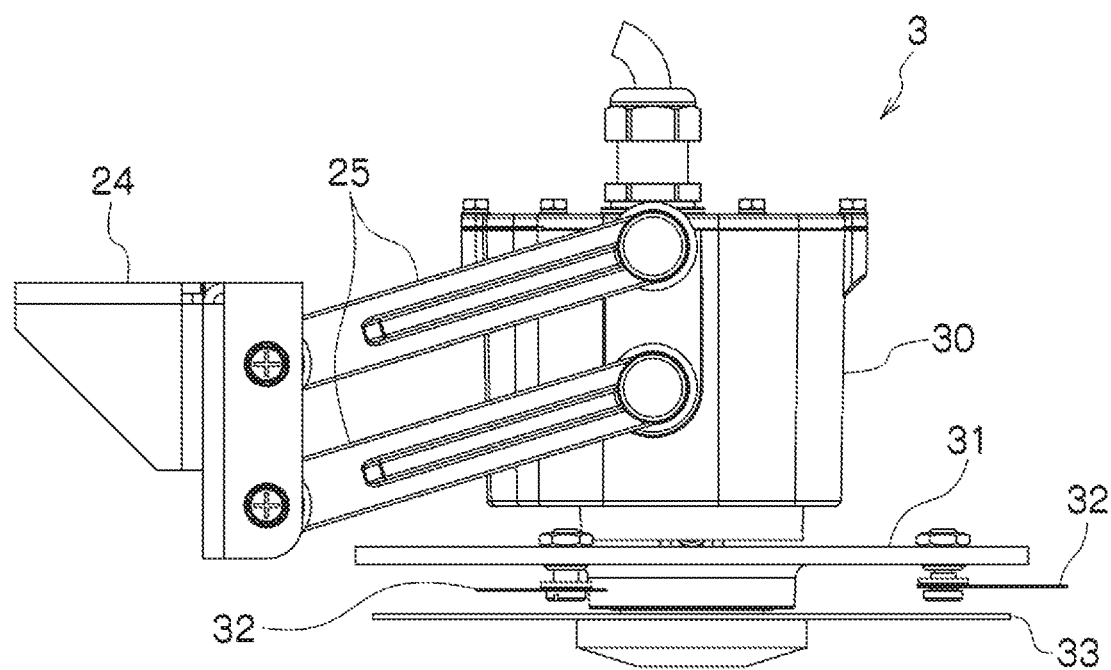
FIG. 3 is a side view of an operating part in the lawn mower.

The operating part 3 performs lawn mowing, and includes a motor 30 and a rotary-driven bladed disk 31 rotary-driven by the motor 30 as shown in FIG. 3. The motor 30 includes a vertically disposed driving shaft. The driving shaft is mounted in the center of the bladed disk 31. The bladed disk 31 is provided with a plane substantially orthogonal to the vertically disposed driving shaft, and is rotary-driven in a state in which the plane faces the field.

Cutting blade pieces 32 are rockably mounted on the outer peripheral part of the bladed disk 31. A protecting plate 33 that protects the cutting blade pieces 32 is provided below the bladed disk 31. The cutting blade pieces 32 project to the outer side of the bladed disk 31 with a centrifugal force according to rotation of the bladed disk 31.

Such a lawn mower 1 performs lawn mowing while traveling in the field. The lawn mower 1 adjusts the height of the operating part 3 with respect to the traveling machine body 2, which travels in an unmanned automatic manner, and rotary-drives the bladed disk 31 to radially project the cutting blade pieces 32 rockably mounted on the outer peripheral part of the bladed disk 31 and cut and trim a lawn in the field at a predetermined height. During work, the cutting blade pieces 32 receive the resistance of the lawn and a centrifugal force by the rotary drive of the bladed disk 31 and always move in a very small angle range. When the cutting blade pieces 32 receive large resistance during the work, the cutting blade pieces 32 retract to the opposite side of a rotating direction of the bladed disk 31. Thereafter, the cutting blade pieces 32 project from the bladed disk 31 with the centrifugal force by the rotary drive of the bladed disk 31. The height of the operating part 3 is adjusted as appropriate according to lawn cutting height.

Figure 4A:
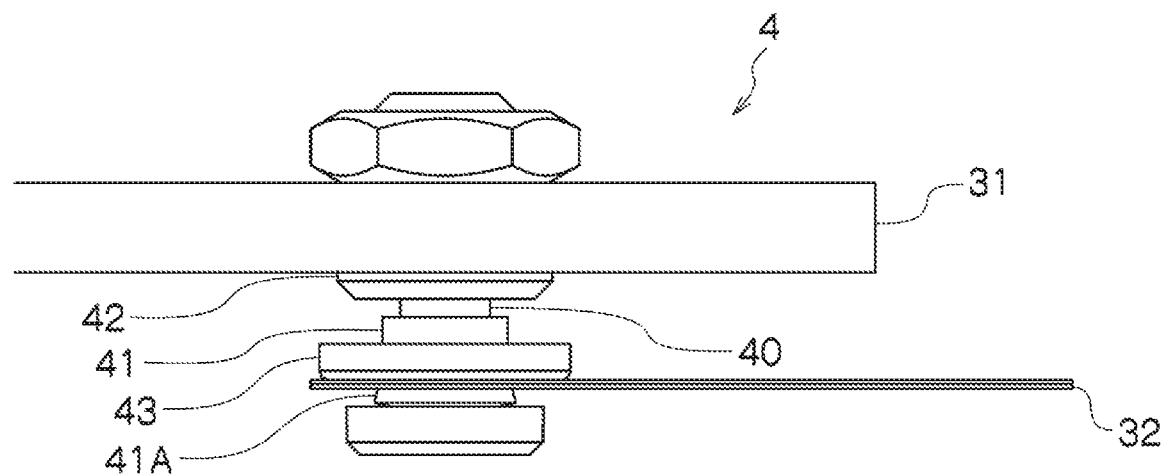
FIG. 4A is an explanatory diagram (a side view) showing a mounting part in which a cutting blade piece is mounted on a bladed disk.
Figure 4B:
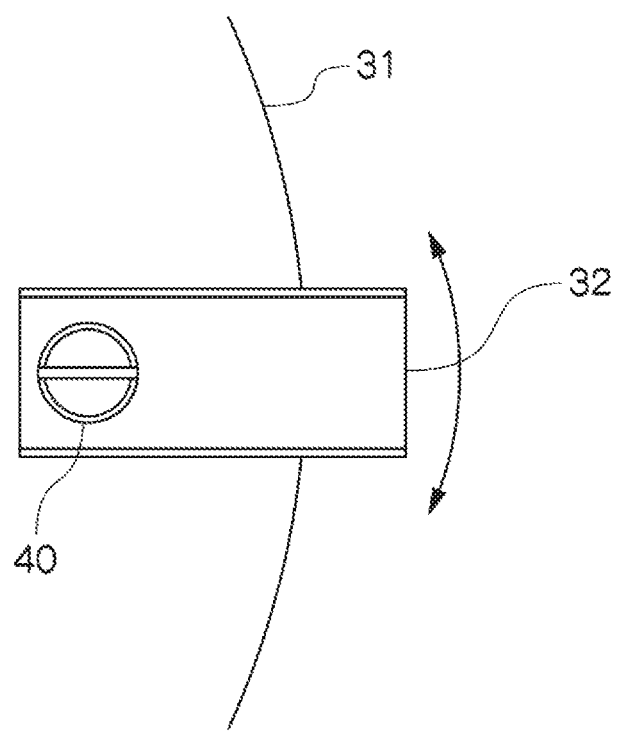
FIG. 4B is an explanatory diagram (a rear view) showing the mounting part in which the cutting blade piece is mounted on the bladed disk.
Figure 5:
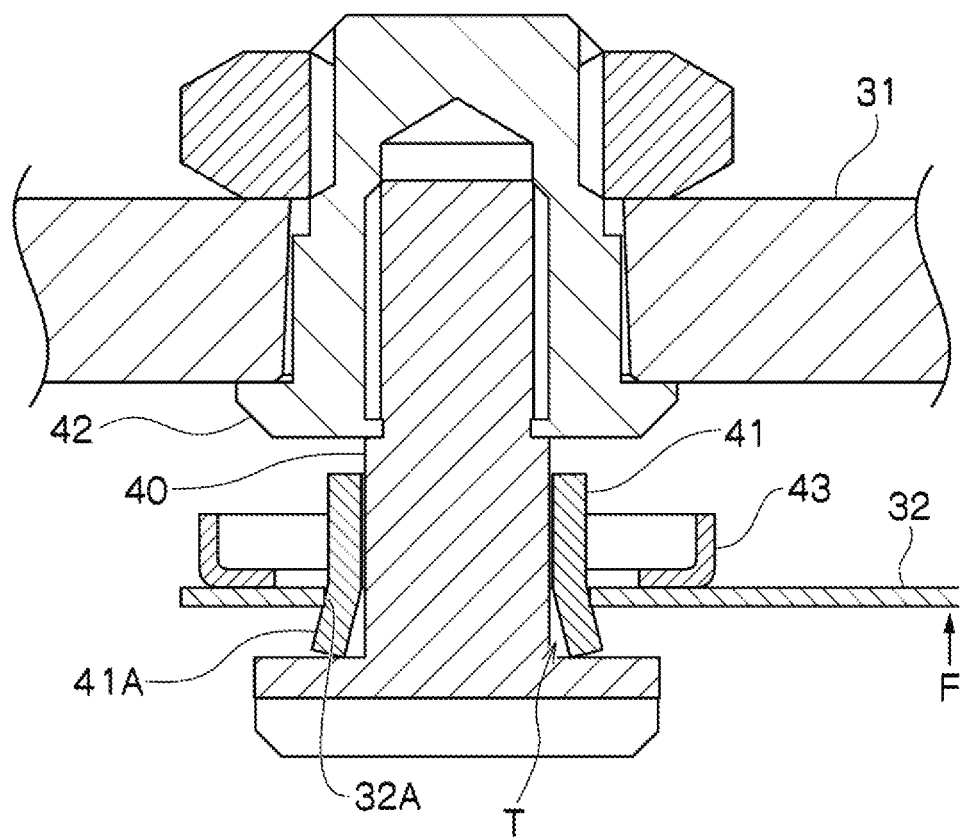
FIG. 5 is a sectional view showing the mounting part in which the cutting blade piece is mounted on the bladed disk.

FIGS. 4A, 4B, and 5 show a mounting part 4 in which the cutting blade piece 32 is mounted on the bladed disk 31. The mounting part 4 includes an axial member 40 mounted to cross a field opposed surface of the bladed disk 31, and a cylindrical member 41 which is hollow and into which the axial member 40 is inserted with a space therebetween. The axial member 40 is specifically an axial bolt, and is provided with a flange at the lower end thereof. The axial member 40 is mounted on the bottom surface of the bladed disk 31 by being coupled to a nut body 42 fixed to the bladed disk 31.

Figure 6A:
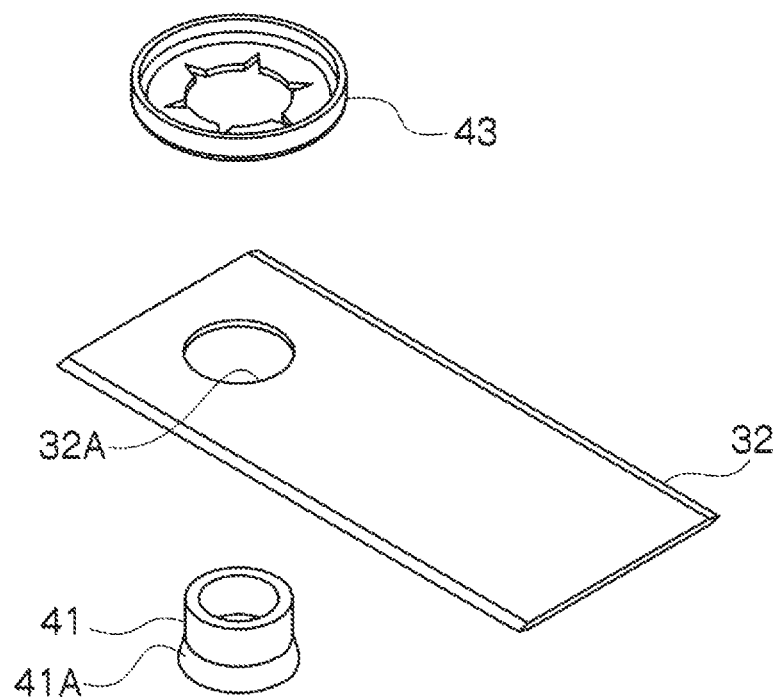
FIG. 6A is an explanatory diagram (an exploded perspective view) showing components for mounting the cutting blade piece on the bladed disk.
Figure 6B:
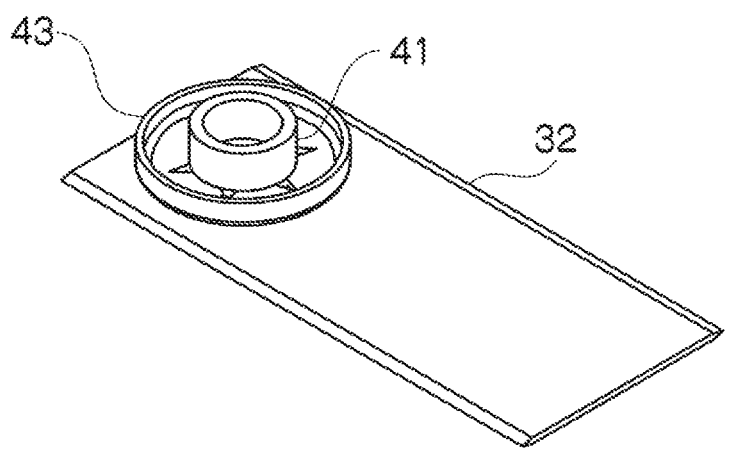
FIG. 6B is an explanatory diagram (an assembly diagram) showing the components for mounting the cutting blade piece on the bladed disk.

The cylindrical member 41 is a so-called collar. The axial member 40 is mounted on the bladed disk 31 in a state in which the cutting blade piece 32 is fixed to the outer periphery of the cylindrical member 41 and the axial member 40 is inserted into the cylindrical member 41. A diameter expanding part 41A is provided at the lower end part of the cylindrical member 41. As shown in FIGS. 6A and 6B, in a state in which the cylindrical member 41 is inserted into a mounting hole 32A of the cutting blade piece 32, a retaining ring 43 that presses the cutting blade piece 32 against the diameter expanding part 41A is inserted over the cylindrical member 41 to fix the cutting blade piece 32 and the cylindrical member 41 to be integrated. To integrate the cutting blade piece 32 and the cylindrical member 41, other fastening members may be used. A rivet, a screw clamp, welding, and the like can be used.

With such a mounting part 4, as shown in FIG. 4B, the cutting blade piece 32 is rockably mounted around the axial member (an axial bolt) 40 substantially perpendicularly mounted with respect to the field opposed surface of the bladed disk 31. However, since the cutting blade piece 32 and the cylindrical member 41 integrally rock, the outer peripheral surface of the axial member 40 and the inner peripheral surface of the cylindrical member 41 are in surface-contact with each other in a relatively wide area with respect to the rock of the cutting blade piece 32. Therefore, compared with when the inner edge of the mounting hole of the thin cutting blade piece 32 is directly in slide contact with the shaft as in the related art, it is possible to prevent wear of the axial member 40 and the mounting hole 32A of the cutting blade piece 32. Consequently, even when the axial member 40 and the cylindrical member 41 are consumable components, it is possible to reduce a replacement frequency as much as possible.

The mounting hole 32A of the cutting blade piece 32 and the outer peripheral surface of the cylindrical member 41 are fixed without a space. During the work, the cutting blade piece 32 receives both of the resistance of the lawn and the centrifugal force by the rotary drive of the bladed disk 31 to always move within the very small angle range. Therefore, the cylindrical member 41 to which the cutting blade piece 32 is integrally fixed also always moves within the very small angle range. In this case, since the axial member 40 is covered by the cylindrical member 41 in a relatively wide range and the movement of the cylindrical member 41 itself is kept within the very small angle range, mowed grass and the like hardly intrude into the space between the outer peripheral surface of the axial member 40 and the inner surface of the cylindrical member 41 and between the mounting hole 32A of the cutting blade piece 32 and the outer peripheral surface of the cylindrical member 41. It is possible to prevent the mowed grass and the like from twining around the axial member 40.

Further, occurrence of clogging of foreign matters intruding into the space between the axial member 40 and the cylindrical member 41 can be prevented by forming the space relatively large. As explained above, the foreign matters intruding into the space can be discharged downward by vibration received from the cylindrical member 41 that is always moving in the very small angle range. Further, as shown in FIG. 5, by forming the cylindrical member 41 in a spreading-out form by increasing the inner diameter of the cylindrical member 41 toward the lower end part such that a space T between the cylindrical member 41 and the axial member 40 expands, the effect of discharging downward the foreign matters intruding into the space can be further enhanced. Consequently, it is possible to eliminate a deficiency in which the cutting blade piece 32 is fixed and the cutting blade piece 32 cannot be allowed to escape from an obstacle.

When an upward strong load F shown in FIG. 5 is applied to the cutting blade piece 32 because, for example, the cutting blade piece 32 collides with an obstacle during the work, the retaining ring 43 comes off and the cutting blade piece 32 escapes upward. Therefore, even in such a case, it is possible to prevent damage of the cutting blade piece 32. During normal work, since the cutting blade piece 32 is fixed to the cylindrical member 41, movement in the height direction of the cutting blade piece 32 is restricted. It is possible to maintain the cutting blade height with respect to the lawn constant.

The embodiment of the present invention is explained above with reference to the drawings. However, a specific configuration is not limited to the embodiment. Changes and the like of design not departing from the spirit of the present invention are included in the present invention.

EXPLANATION OF REFERENCE NUMERALS

1 Lawn mower
1A Enclosure
2 Traveling machine body
20 Drive wheel
21 Driving part
22 Steering wheel
23 Steering adjusting part
24 Frame
25 Parallel link
26 Coupling frame
3 Operating part
30 Motor
31 Bladed disk
32 Cutting blade piece
32A Mounting hole
33 Protecting plate
4 Mounting part
40 Axial member
41 Cylindrical member
42 Nut body
43 Retaining ring

What is claimed is:

1. A lawn mower in which an operating part that performs lawn mowing is equipped in a traveling machine body that travels in a field, wherein
   the operating part comprises a rotary-driven bladed disk in a state of facing the field, and a cutting blade piece rockably mounted on an outer peripheral part of the bladed disk,
   a mounting part in which the cutting blade piece is mounted on the bladed disk comprises an axial member mounted to cross a field opposed surface of the bladed disk, and a cylindrical member which is hollow and into which the axial member is inserted with a space therebetween,
   the axial member is mounted on the bladed disk such that the cutting blade piece is fixed to a flared end portion of the cylindrical member and the axial member is inserted into the cylindrical member, and
   the cylindrical member transitions from a cylindrical top portion having a first diameter to the flared end portion, the flared end portion continuously expanding in diameter from a beginning of the flared end portion to an end of the flared end portion, wherein the cutting blade piece forms an opening having a diameter greater than the first diameter and smaller than a diameter of a portion of the flared end portion, and wherein a fastening member urges an inner surface that defines the opening against the flared end portion to thereby fix the fastening member, the cylindrical member, and the cutting blade piece to one another such that the fastening member, the cylindrical member, and the cutting blade piece are configured to move together as a single component.

2. The lawn mower according to claim 1, wherein the space between the cylindrical member and the axial member expands toward a lower end part of the cylindrical member.

3. The lawn mower according to any one of claim 1, wherein the traveling machine body is capable of traveling in a field in an unmanned automatic manner and the operating part is provided inside an enclosure.

* * * * *